(12) United States Patent
Sanderson et al.

(10) Patent No.: US 12,545,632 B2
(45) Date of Patent: Feb. 10, 2026

(54) METHOD FOR MAKING PYROTECHNIC MATERIAL AND RELATED TECHNOLOGY

(71) Applicant: Armtec Defense Products Co., Coachella, CA (US)

(72) Inventors: Andrew John Sanderson, Indio, CA (US); Yetta Denise Eagleman, Camden, AR (US)

(73) Assignee: Armtec Defense Products Co., Coachella, CA (US)

( * ) Notice: Subject to any disclaimer, the term of this patent is extended or adjusted under 35 U.S.C. 154(b) by 717 days.

(21) Appl. No.: 17/521,116

(22) Filed: Nov. 8, 2021

(65) Prior Publication Data

US 2022/0203439 A1 Jun. 30, 2022

Related U.S. Application Data

(62) Division of application No. 16/251,005, filed on Jan. 17, 2019, now Pat. No. 11,167,346.

(Continued)

(51) Int. Cl.
*C06B 45/10* (2006.01)
*B22F 1/102* (2022.01)
(Continued)

(52) U.S. Cl.
CPC ............. *C06B 45/10* (2013.01); *B22F 1/102* (2022.01); *C06B 23/009* (2013.01); *C06B 27/00* (2013.01);
(Continued)

(58) Field of Classification Search
None
See application file for complete search history.

(56) References Cited

U.S. PATENT DOCUMENTS 3,493,446 A * 2/1970 Braun ................. C06B 21/0083
149/7
3,853,645 A * 12/1974 Kaufman ................ C06B 45/10
149/19.91

(Continued)

FOREIGN PATENT DOCUMENTS

EP 1500639 B1 3/2014

OTHER PUBLICATIONS

International Searching Authority, International Search Report and Written Opinion, PCT Patent Application PCT/US2019/014087, mailed Apr. 11, 2019, 8 pages.

*Primary Examiner* — Aileen B Felton
(74) *Attorney, Agent, or Firm* — Perkins Coie LLP

(57) ABSTRACT

A method for making a pyrotechnic composition in accordance with an embodiment of the present technology includes flowing metal powder, polytetrafluoroethylene powder, and binder powder in separate respective feed streams toward an extruder. The binder powder includes adhesive material and polytetrafluoroethylene anticaking material coating the adhesive material. The method further includes interspersing the metal powder, the binder powder, and the fluoropolymer powder to form a mixture. This mixture is then subjected to an extrusion process during which the anticaking material coating the adhesive material is disrupted. This releases the adhesive material to bind together the metal powder and the polytetrafluoroethylene powder in the extrudate. The powder mixture includes no solvent at any time between being formed and being extruded, yet the extrudate is well-mixed and cohesive.

13 Claims, 3 Drawing Sheets

Related U.S. Application Data

(60) Provisional application No. 62/618,769, filed on Jan. 18, 2018.

(51) Int. Cl.
  *C06B 23/00*   (2006.01)
  *C06B 27/00*   (2006.01)
  *C06C 15/00*   (2006.01)

(52) U.S. Cl.
  CPC ........ *C06C 15/00* (2013.01); *B22F 2301/058* (2013.01)

(56) References Cited

U.S. PATENT DOCUMENTS

| | | |
|---|---|---|
| 4,145,328 A | 3/1979 | Juneau et al. |
| 4,432,816 A | 2/1984 | Kennedy et al. |
| 5,565,150 A | 10/1996 | Dillehay et al. |
| 5,660,934 A | 8/1997 | Longo |
| 5,886,293 A | 3/1999 | Nauflett et al. |
| 6,689,285 B2 | 2/2004 | Rusin et al. |
| 11,167,346 B2 | 11/2021 | Sanderson et al. |
| 2004/0226638 A1* | 11/2004 | Posson ................ C06B 21/0025 149/109.6 |
| 2004/0253387 A1 | 12/2004 | Cavero |
| 2016/0115090 A1 | 4/2016 | Moretti et al. |

\* cited by examiner

METHOD FOR MAKING PYROTECHNIC MATERIAL AND RELATED TECHNOLOGY

CROSS REFERENCE TO RELATED APPLICATION

This patent application is a divisional of U.S. patent application Ser. No. 16/251,005, titled METHOD FOR MAKING PYROTECHNIC MATERIAL AND RELATED TECHNOLOGY, filed Jan. 17, 2019, and issued as U.S. Pat. No. 11,167,346, which claims priority to and the benefit of U.S. Provisional Patent Application No. 62/618,769, titled METHOD FOR MAKING PYROTECHNIC MATERIAL AND RELATED TECHNOLOGY, filed Jan. 18, 2018, both of which are incorporated herein in their entirety by reference thereto.

TECHNICAL FIELD

The present technology is related to pyrotechnic material used in decoy flares and other applications.

BACKGROUND

Military aircraft often carry decoy flares including pyrotechnic material. The flares can be ejected and ignited to produce infrared radiation that confuses heat-seeking missiles. For example, as a heat-seeking missile approaches an aircraft, the aircraft may eject and ignite a decoy flare that burns to produce infrared radiation simulating infrared radiation produced by the aircraft's engines. The approaching heat-seeking missile then tends to follow the decoy flare instead of the aircraft. One example of a pyrotechnic material well suited for use in decoy flares is a mixture of magnesium, Teflon® (polytetrafluoroethylene), and Viton® (a copolymer including vinylidene fluoride and hexafluoropropylene monomers) commonly referred to as "MTV." Teflon® and Viton® are commercial products available from E.I. du Pont de Nemours and Company (Wilmington, Delaware). When MTV is ignited, the magnesium reacts with the polytetrafluoroethylene to produce magnesium fluoride and carbon. This reaction is highly exothermic, producing a brief burst of high-intensity heat in a small area.

The most common conventional method for manufacturing MTV is known as the "shock-gel method." In this method, the Viton® copolymer monomers is first dissolved in acetone to form a solution. Next, the magnesium and the polytetrafluoroethylene are added to the solution to form a slurry. Hexane is then rapidly added to this slurry while it is being rapidly agitated, which causes MTV to precipitate out in a granular form. The hexane/acetone mixture is removed and the granular MTV is washed with hexane. Finally, the granular MTV is compression molded or extruded into a desired form. The shock-gel method and related conventional methods for manufacturing MTV have been in use for decades, but they have significant drawbacks. For example, these conventional methods tend to create dangerous processing environments and to consume large amounts of solvent. Despite the drawbacks, these methods continue to be used today due to a lack of acceptable alternatives. For at least this reason, there is a need for innovation in this field.

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present technology. For ease of reference, throughout this disclosure identical reference numbers may be used to identify identical, similar, or analogous components or features of more than one embodiment of the present technology.

DETAILED DESCRIPTION

Figure 1:
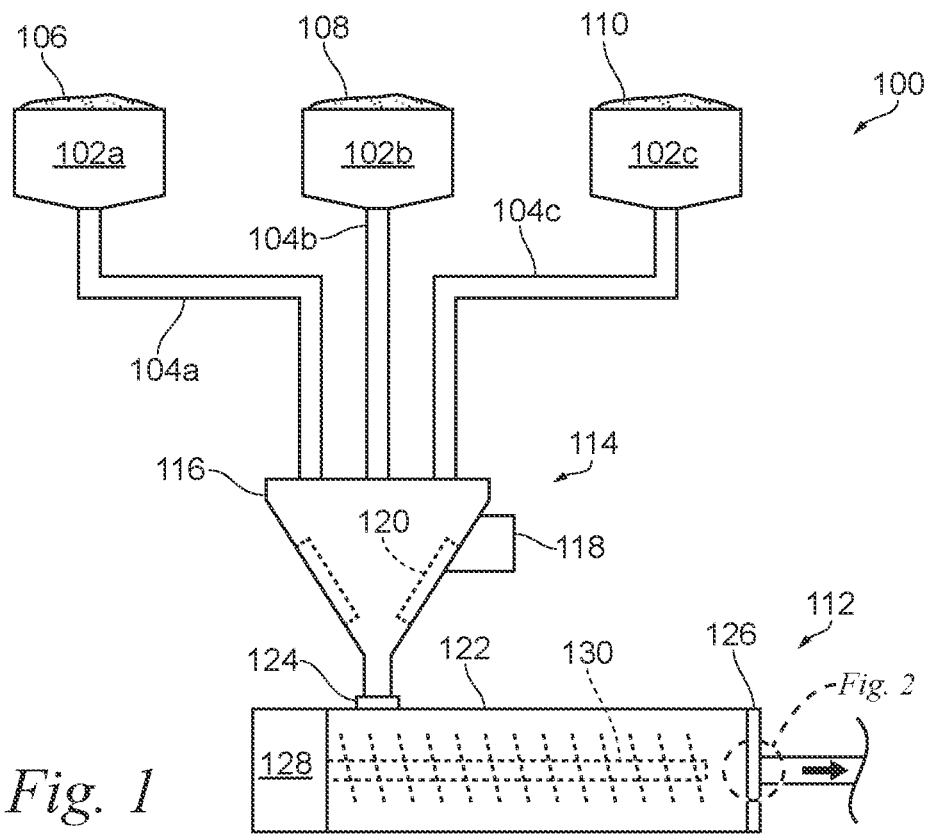
FIG. 1 is a partially schematic view of a system for making an extruded pyrotechnic material in accordance with an embodiment of the present technology.

Methods for making pyrotechnic material and related methods, compositions, and systems in accordance with embodiments of the present technology can at least partially address one or more problems associated with conventional technologies, whether or not such problems are stated herein. A method in accordance with a particular embodiment includes mixing metal powder, fluoropolymer powder, and adhesive material without dissolving the adhesive material in solvent. In conventional methods, solvent is used to distribute adhesive material around particles of metal and fluoropolymer. While effective for this purpose, solvent-based mixing undesirably involves forming large quantities of collectively ignitable pyrotechnic material before the material is divided into individual pieces. If accidentally ignited, these large quantities of pyrotechnic material have the potential to be highly destructive. Furthermore, the use of solvent in conventional methods adds significant complexity and cost to these methods due, among other things, to the need for compliance with solvent-related health and environmental regulations. As yet another consideration, any residual solvent left in a finished pyrotechnic material may adversely affect the material's performance.

Rather than using the conventional approach of mixing metal, fluoropolymer, and adhesive in a solvent as discussed above, these components are mixed as powders in methods in accordance with at least some embodiments of the present technology. Adhesive material suitable for use in pyrotechnic material tends to be sticky and/or gelatinous, making handling small particles of such material practically challenging. The inventors have discovered, however, that small particles of adhesive material coated with an anticaking material to produce a free-flowing powder can be mixed readily with metal powder and fluoropolymer powder to form a powder mixture. Provided the anticaking agent is suitable, upon extrusion of the powder mixture under the correct conditions, the adhesive material is released or exposed to bind together the metal powder and fluoropolymer powder. This results in a well-mixed and cohesive extrudate without the use of solvent. In contrast to conventional methods, methods for making pyrotechnic material in accordance with embodiments of the present technology can be safer, lower cost, more reliable, more efficient, and/or have other significant advantages.

Specific details of methods for making pyrotechnic material and related methods, compositions, and systems in accordance with several embodiments of the present technology are described herein with reference to FIGS. 1-5. Although these methods, compositions, and systems may be disclosed herein primarily or entirely in the context of metal-fluoropolymer pyrotechnic material (e.g., MTV), other contexts in addition to those disclosed herein are within the scope of the present technology. For example, features of described methods for making metal-fluoropolymer pyrotechnic material may be implemented in the context of pyrotechnic material made from metal and inorganic oxidizers (e.g., potassium perchlorate). Furthermore, it should be understood, in general, that other methods, compositions, and systems in addition to those disclosed herein are within the scope of the present technology. For example, methods, compositions, and systems in accordance with embodiments of the present technology can have different and/or additional operations, components, and configurations than those disclosed herein. Moreover, a person of ordinary skill in the art will understand that methods, compositions, and systems in accordance with embodiments of the present technology can be without one or more of the operations, components, and/or configurations disclosed herein without deviating from the present technology.

FIG. 1 is a partially schematic view of a system 100 for making extruded pyrotechnic material in accordance with an embodiment of the present technology. The system 100 includes containers 102 (individually identified as containers 102a-102c), and conveyances 104 (individually identified as conveyances 104a-104c) downstream from the containers 102. The containers 102a-102c carry sources of metal powder 106, fluoropolymer powder 108, and binder powder 110, respectively. In some cases, the metal powder 106 is magnesium powder, the fluoropolymer powder 108 is polytetrafluoroethylene powder, and the binder powder 110 is a composite of polytetrafluoroethylene and a copolymer including vinylidene fluoride and hexafluoropropylene monomers. In other cases, one, some, or all of the metal powder 106, the fluoropolymer powder 108, and the binder powder 110 can have other suitable compositions.

In the illustrated embodiment, the containers 102a-102c are hoppers that dispense the metal powder 106, the fluoropolymer powder 108, and the binder powder 110, respectively, by gravity. In another embodiment, counterpart sources of the metal powder 106, the fluoropolymer powder 108, and the binder powder 110 can be uncontained. In yet another embodiment, counterparts of the containers 102a-102c can present, but have other suitable forms. Similarly, in the illustrated embodiment, the conveyances 104a-104c are tubes that carry the metal powder 106, the fluoropolymer powder 108, and the binder powder 110, respectively, by gravity. In another embodiment, counterparts of the conveyances 104a-104c can be chutes, belts, etc. Furthermore, counterparts of the conveyances 104a-104c can carry the metal powder 106, the fluoropolymer powder 108, and the binder powder 110, respectively, by positive pressure, by negative pressure, by operation of mechanical feeders, and/or in another suitable manner in addition to or instead of by gravity.

With reference again to the illustrated embodiment, the system 100 includes an extruder 112 downstream from the containers 102 and the conveyances 104. The system 100 further includes a mixer 114 downstream from the conveyances 104 and upstream from the extruder 112. The mixer 114 includes a funnel 116 and a mixing driver 118 configured to drive rotation of the funnel 116. The funnel 116 is configured to collect and intersperse the metal powder 106, the fluoropolymer powder 108, and the binder powder 110 from the conveyances 104a-104c, respectively. In particular, the funnel 116 includes internal baffles 120 configured to stir the metal powder 106, the fluoropolymer powder 108, and the binder powder 110 as the mixing driver 118 rotates the funnel 116. In another embodiment, a counterpart of the mixer 114 can have another suitable form. For example, a counterpart of the mixer 114 can include a stationary vessel containing a mechanically driven stir rod or other stir system. In yet another embodiment, counterparts of the metal powder 106, the fluoropolymer powder 108, and the binder powder 110 can flow directly from counterparts of the conveyances 104a-104c, respectively, into a counterpart of the extruder 112 and can mix within the counterpart extruder. For example, the counterpart extruder can include separate inlets for the counterpart metal powder, fluoropolymer powder, and binder powder, respectively.

Figure 2:
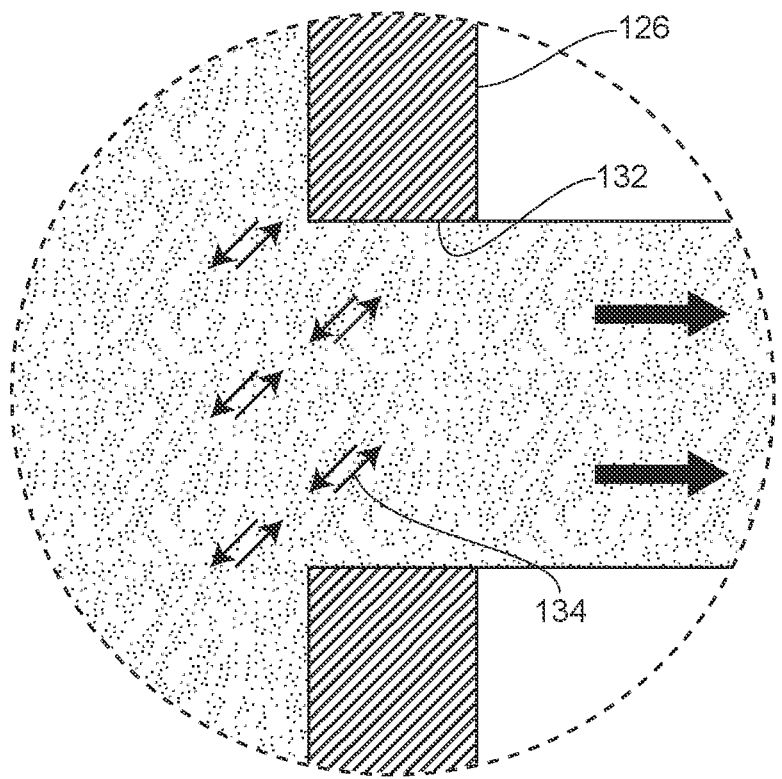
FIG. 2 is an enlarged cross-sectional view of a portion of FIG. 1.

FIG. 2 is an enlarged cross-sectional view of a portion of FIG. 1. With reference to FIGS. 1 and 2 together, the extruder 112 includes an elongate housing 122 and an inlet 124 at which the extruder 112 is operably connected to the mixer 114. The extruder 112 further includes a die 126 at one end of the housing 122, an extruding driver 128 at an opposite end of the housing 122, and a screw 130 extending axially between the inlet 124 and the die 126. The extruder 112 is configured to receive a mixture of the metal powder 106, the fluoropolymer powder 108, and the binder powder 110 from the mixer 114 via the inlet 124. The extruding driver 128 is configured to drive rotation of the screw 130, thereby urging the received mixture toward the die 126. As shown in FIG. 2, the die 126 includes an opening 132 through which the mixture is forced under pressure from operation of the screw 130. At the die 126, the mixture is subjected to shear forces represented by arrows 134. The shear forces acting on the mixture as it moves toward and through the die 126 may promote conversion of the mixture from a free-flowing powder form to a cohesive solid or semi-solid form. Alternatively or in addition, heating of the mixture and/or other forces acting on the mixture as it moves toward and through the die 126 may promote this conversion. In another embodiment, a counterpart of the extruder 112 can have another suitable form. For example, a counterpart of the extruder 112 can include a hydraulically driven press instead of the screw 130.

Figure 3:
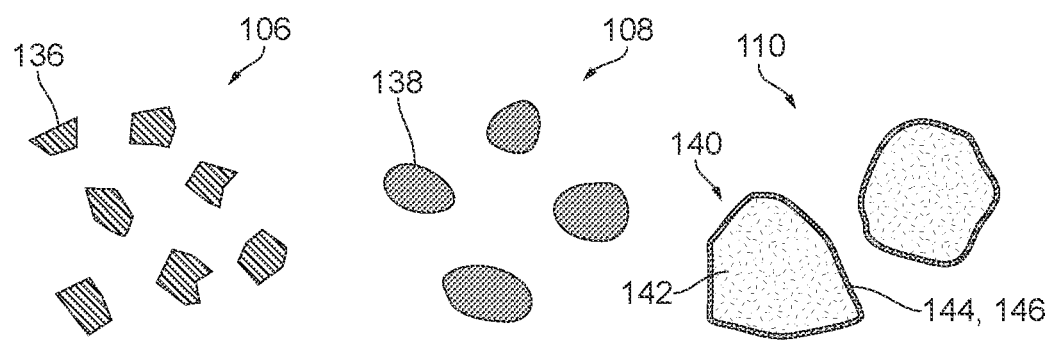
FIG. 3 is an enlarged cross-sectional view of metal powder, fluoropolymer powder, and binder powder before extrusion in accordance with an embodiment of the present technology.

FIG. 3 is an enlarged cross-sectional view of the metal powder 106, the fluoropolymer powder 108, and the binder powder 110 before extrusion in accordance with an embodiment of the present technology. As shown in FIG. 3, individual particles 136 of the metal powder 106 and individual particles 138 of the fluoropolymer powder 108 are homogeneous, whereas individual particles 140 of the binder powder 110 are heterogeneous. In particular, a given particle 140 of the binder powder 110 includes adhesive material 142 and anticaking material 144 disposed in a coating 146 around the adhesive material 142. In some cases, the adhesive material 142 is a copolymer including vinylidene fluoride and hexafluoropropylene monomers, and the anticaking material 144 is a fluoropolymer, such as polytetrafluoroethylene. In other cases, one or both of the adhesive material 142 and the anticaking material 144 can have other suitable compositions. In the illustrated embodiment, the coatings 146 are continuous. In other embodiments, counterparts of the coatings 146 can have discontinuities (e.g., gaps, holes, etc.). One example of a suitable method for forming the coatings 146 includes tumble mixing micron sized particles of the anticaking agent with finely separated particles of the adhesive material.

In the illustrated embodiment, the composition of the anticaking material 144 is the same as that of the fluoropolymer powder 108. Thus, the primary constituent materials of pyrotechnic material resulting from extruding a mixture of the metal powder 106, the fluoropolymer powder 108, and the binder powder 110 may be the same as the primary constituent materials of a pyrotechnic material made by combining the metal of the metal powder 106, the fluoropolymer of the fluoropolymer powder 108, and the adhesive material 142 of the binder powder 110 by a conventional process. This can be useful, for example, to avoid any performance uncertainly associated with adding a new material to a well-known pyrotechnic formulation. In other embodiments, the anticaking material 144 and the fluoropolymer powder 108 may have different compositions. In at least one embodiment, the weight of the anticaking material 144 in the mixture is less than approximately 20% of the weight of the binder powder 110 in the mixture.

Figure 4:
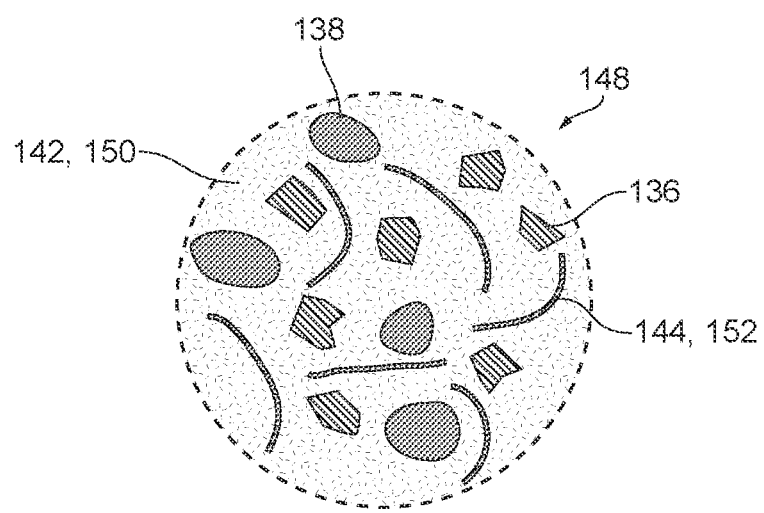
FIG. 4 is an enlarged cross-sectional view of an extruded pyrotechnic material in accordance with an embodiment of the present technology.

FIG. 4 is an enlarged cross-sectional view of an extruded pyrotechnic material 148 in accordance with an embodiment of the present technology. As shown in FIG. 4, the extruded pyrotechnic material 148 includes the particles 136 of the metal powder 106 in an intact state and the particles 138 of the fluoropolymer powder 108 also in an intact state. In contrast, the particles 140 of the binder powder 110 are disrupted in the extruded pyrotechnic material 148. In particular, the metal powder 106 and the fluoropolymer powder 108 are disposed within a matrix 150 of the adhesive material 142 liberated from the disrupted particles 140 of the binder powder 110. The extruded pyrotechnic material 148 also includes sheared pieces 152 of the coatings 146 within the matrix 150. In the illustrated embodiment, the coatings 146 have some physical integrity that persists after the particles 140 of the binder powder 110 are disrupted. In other embodiments, counterparts of the coatings 146 can be fully dispersed counterparts of the particles 140 which are disrupted. The extruded pyrotechnic material 148 of the illustrated embodiment includes no solvent, unless a trace concentration of solvent (e.g., no solvent) was present in the powdered materials when the powders are added to their respective containers.

Figure 5:
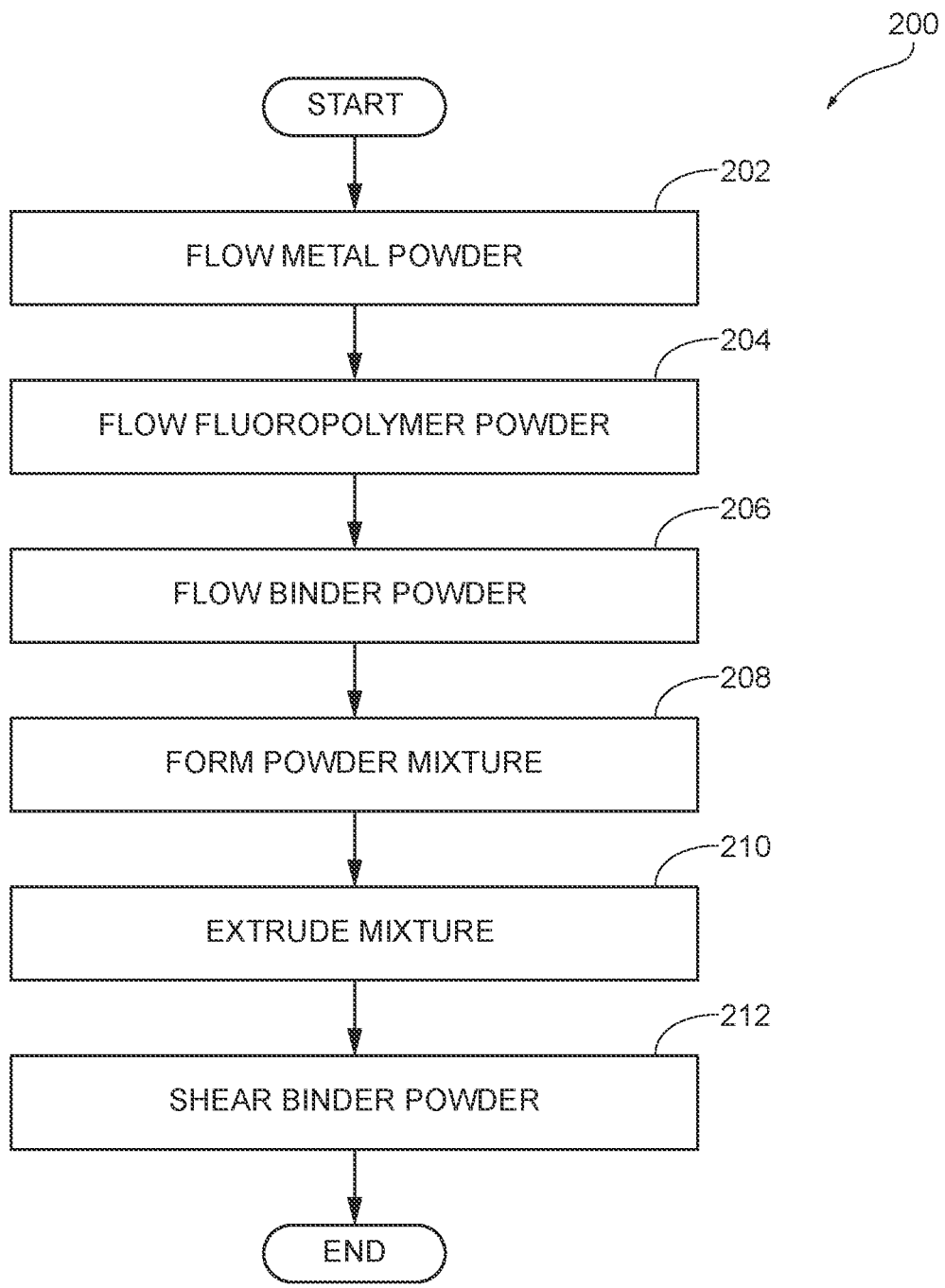
FIG. 5 is a flow chart illustrating a method for making a pyrotechnic material in accordance with an embodiment of the present technology.

FIG. 5 is a flow chart illustrating a method 200 for making a pyrotechnic material in accordance with an embodiment of the present technology. With reference to FIGS. 1-5 together, the method 200 includes flowing the metal powder 106 (block 202), flowing the fluoropolymer powder 108 (block 204), and flowing the binder powder 110 (block 206) along the conveyances 104a-104c, respectively, toward the extruder 112 in separate respective feed streams. The method 200 further includes interspersing the metal powder 106, the fluoropolymer powder 108, and the binder powder 110 to form a powder mixture (block 208). In some cases, forming the powder mixture occurs at the mixer 114. In other cases, forming the powder mixture occurs within the extruder 112 at or downstream from the inlet 124. Furthermore, in some cases, forming the powder mixture includes stirring the metal powder 106, the fluoropolymer powder 108, and the binder powder 110 within the mixer 114 and/or within the extruder 112. In other cases, the metal powder 106, the fluoropolymer powder 108, and the binder powder 110 can be interspersed without stirring, such as by merging their respective flow paths. The method 200 includes mixing the powders in air and extruding the mixture under vacuum to avoid entraining air in the extruded mixture and to help avoid heating the extruded material via adiabatic compression of air, thereby avoiding inadvertent ignition of the compound during extrusion.

With reference again to FIG. 5, the method 200 further includes extruding a mixture of the metal powder 106, the fluoropolymer powder 108, and the binder powder 110 to form an extrudate in which the adhesive material 142 binds together the metal powder 106 and the fluoropolymer powder 108 (block 210). In conjunction with extruding the mixture, the method 200 includes shearing the binder powder 110 (block 212) to cause the adhesive material 142 to bind together the metal powder 106 and the fluoropolymer powder 108. In one embodiment, the process of shearing the binder powder 110 can include applying moderate heat to the binder powder, such as just before shearing or during the sharing process. In one embodiment, the binder powder is heated to over approximately 120° F., and preferably over approximately 150°-160° F. to an elevated temperature that still allows workers to effectively utilize the equipment during the extruding process. Elevating the temperature of the binder powder too high (e.g., 300°-400° F. in some embodiments) may make handling of the extruding equipment and related processes impractical or too inefficient. Extruding the mixture includes forcing the mixture through the die 126 to form an extrudate. The binder powder 110 shears at the die 126 to uncover the adhesive material 142 and to increase contact between the adhesive material 142 and the metal powder 106. Alternatively or in addition, shearing the binder powder 110 can occur after flowing the binder powder 110 toward the extruder 112 and before extruding the mixture. For example, shearing the binder powder 110 can occur partially or entirely within the mixer 114.

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown and/or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments may also exhibit such advantages, and not all embodiments need necessarily exhibit such advantages or other advantages disclosed herein to fall within the scope of the present technology.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) and/or one or more additional types of features are not precluded. Directional terms, such as "upper," "lower,"

"front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments of the present technology.

We claim:

1. An extruded pyrotechnic composition, comprising:
    ignitable metal particles provided from metal powder, wherein the metal particles are homogenous and in a first intact state;
    fluoropolymer particles provided from fluoropolymer powder, wherein the fluoropolymer particles are homogenous and in a second intact state; and
    a heterogenous binder powder comprising a mixture of adhesive material and anticaking material, wherein at least a portion of the binder mixture is formed by:
        disrupted particles that include a first portion of the adhesive material being coated by the anticaking material in a sheared state; and
        a second portion of the adhesive material liberated from the disrupted particles during extrusion;
    wherein the liberated adhesive material forms a matrix containing:
        the metal particles in the first intact state;
        the fluoropolymer particles in the second intact state; and
        the disrupted particles that include the first portion of the adhesive material coated by the anticaking material.

2. The composition of claim 1 wherein:
    the metal powder is magnesium powder; and
    the fluoropolymer powder is polytetrafluoroethylene powder.

3. The composition of claim 1 wherein the anticaking material comprises a fluoropolymer material coating the second portion of the adhesive material.

4. The composition of claim 1 wherein:
    the fluoropolymer powder is polytetrafluoroethylene powder; and
    the anticaking material is polytetrafluoroethylene.

5. The composition of claim 1 wherein the adhesive material is a copolymer including vinylidene fluoride and hexafluoropropylene monomers.

6. The composition of claim 1 including no solvent.

7. The composition of claim 1 wherein the ignitable metal particles are configured to exothermically react with the fluoropolymer particles upon ignition to generate a brief burst of high-intensity heat.

8. A method for using an extruded pyrotechnic composition, comprising:
    providing an extruded pyrotechnic composition that comprises:
        ignitable metal particles provided from metal powder, wherein the metal particles are homogenous and in a first intact state;
        fluoropolymer particles provided from fluoropolymer powder, wherein the fluoropolymer particles are homogenous and in a second intact state; and
        a heterogenous binder powder comprising a mixture of adhesive material and anticaking material, wherein at least a portion of the binder mixture is formed by:
            disrupted particles that include a first portion of the adhesive material coated by the anticaking material in a sheared state; and
            a second portion of the adhesive material liberated from the disrupted particles during extrusion;
        wherein the liberated adhesive material forms a matrix containing:
            the metal particles in the first intact state;
            the fluoropolymer particles in the second intact state; and
            the disrupted particles that include the first portion of the adhesive material coated by the anticaking material; and
    igniting the extruded pyrotechnic composition.

9. The method of claim 8 wherein providing the extruded pyrotechnic composition comprises providing the extruded pyrotechnic composition wherein:
    the metal powder is magnesium powder; and
    the fluoropolymer powder is polytetrafluoroethylene powder.

10. The method of claim 8 wherein providing the extruded pyrotechnic composition comprises providing the extruded pyrotechnic composition wherein the anticaking material comprises a fluoropolymer material coating the second portion of the adhesive material.

11. The method of claim 8 wherein providing the extruded pyrotechnic composition comprises providing the extruded pyrotechnic composition wherein:
    the fluoropolymer powder is polytetrafluoroethylene powder; and
    the anticaking material is polytetrafluoroethylene.

12. The method of claim 8 wherein providing the extruded pyrotechnic composition comprises providing the extruded pyrotechnic composition wherein the adhesive material is a copolymer including vinylidene fluoride and hexafluoropropylene monomers.

13. The method of claim 8 wherein igniting the extruded pyrotechnic composition causes the ignitable metal particles to exothermically react with the fluoropolymer particles upon ignition to generate a brief burst of high-intensity heat.

* * * * *